Oct. 23, 1923.

T. H. GREENWAY 1,471,954

POISON HOLDER FOR RODENTS

Filed July 14, 1921

Inventor
T. H. Greenway

Patented Oct. 23, 1923.

1,471,954

UNITED STATES PATENT OFFICE.

THOMAS H. GREENWAY, OF VALLEY, WASHINGTON.

POISON HOLDER FOR RODENTS.

Application filed July 14, 1921. Serial No. 484,662.

*To all whom it may concern:*

Be it known that THOMAS H. GREENWAY, a citizen of the United States of America, residing at Valley, in the county of Stevens and State of Washington, has invented new and useful Improvements in Poison Holders for Rodents, of which the following is a specification.

The object of the invention is to provide a simple and efficient means for destroying rodents particularly of the type which especially in some parts of the country are found to be destructive of crops, which are difficult to catch in animal traps and which while more easily destroyed by poison are not generally successfully attacked in this way because of the fact that the use of poison under the ordinary conditions exposes poultry, cattle, dogs, horses and the like and also game birds and song birds to the destructive effect thereof; and therefore it is the particular object of this invention to provide a means whereby poison may be rendered accessible to the objectionable and destructive rodents such as squirrels without involving at the same time the risk of similarly exposing other animals and birds; and with this object in view the invention consists in a construction and combination of parts of which a preferred embodiment is shown in the accompanying drawings, wherein:

Figure 1:
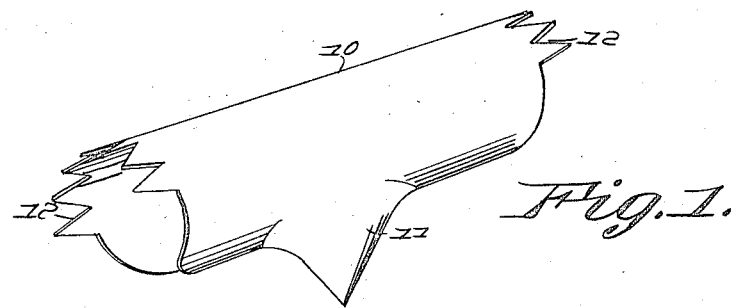
Figure 1 is a perspective view of a poison holder constructed in accordance with the invention.
Figure 2:
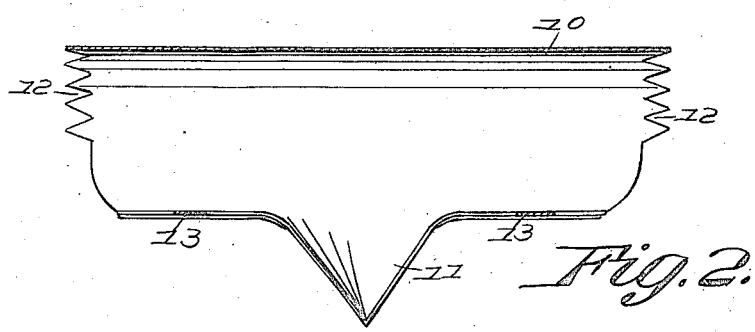
Figure 2 is a longitudinal sectional view of the same.
Figure 3:
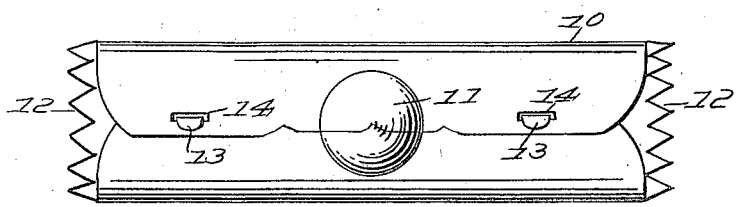
Figure 3 is a bottom plan view.
Figure 4:
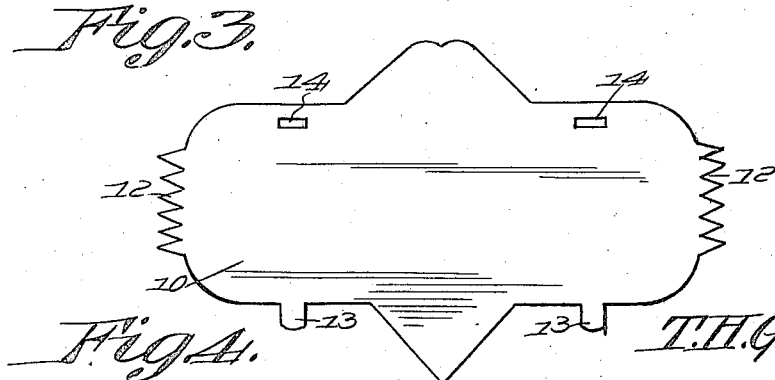
Figure 4 is a view of the blank.

The device consists essentially of an open ended cylinder or tube 10 of relatively small diameter, sufficient in size to admit animals of the destructive rodent type while too small to give access to dogs, chickens and the like as well as cattle, and at the center of the length thereof is arranged a downwardly tapered or conical pocket 11 forming a receptacle for the poison or poisoned food, consisting for example of flour, sugar and salt with strychnine or its equivalent. In this form the device can readily be positioned on the mounds or knolls near the feeding grounds or holes of the rodents, the conical or pointed pocket portion of the apparatus being depressed or forced downward into the soil to hold the device in a firm position, and while animals of the type indicated as objectionable will readily enter such a device and are particularly fond of a mixture such as that indicated, the shape of the device serves to deter birds from entering and also serves to prevent access by larger animals.

As an additional means of protection the upper portions of the end edges of the cylinder are serrated as shown at 12, this means of defense serving particularly to prevent fowls and dogs from reaching the poison.

Moreover it is preferred to construct a device from a sheet metal blank so that the same may be shipped to the user for folding into the proper form after receipt. To this end the blank is stamped with lateral intermediate substantially triangular projections on its longitudinal edges with the teeth 12 stamped on the end edges folded into cylindrical form, the triangular lateral projections providing complemental elements forming a pocket 11 and in order that the edges may be maintained in the proper position there are formed on one longitudinal edge the slots 14 and directly opposite them the tongues 13 for insertion through the slots to maintain the two longitudinal edges in interlocking engagement.

Having described the invention, what is claimed as new and useful is:—

A poison holder formed from a sheet metal blank provided with lateral substantially triangular projections on its longitudinal edges at substantially intermediate points, the said blank being foldable into cylindrical form when the said lateral projections form the complemental elements for a tapering or conical pocket, the longitudinal edges of said blank having interlocking means disposed on opposite sides of the projections for the purpose provided.

In testimony whereof he affixes his signature.

THOMAS H. GREENWAY.